United States Patent
Jiang et al.

(10) Patent No.: US 6,707,629 B1
(45) Date of Patent: Mar. 16, 2004

(54) DIGITAL TEMPERATURE MONITOR

(75) Inventors: Hong Jiang, Plano, TX (US); Paul Merle Emerson, Murphy, TX (US); Bryan E. Bloodworth, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 374 days.

(21) Appl. No.: 09/608,896

(22) Filed: Jun. 30, 2000

(51) Int. Cl.[7] .................................................. G11B 5/09
(52) U.S. Cl. ........................................... 360/67; 360/68
(58) Field of Search ............................... 360/67, 65, 69, 360/31, 68; 324/760; 330/256

(56) References Cited

U.S. PATENT DOCUMENTS 5,455,510 A * 10/1995 Nelson ....................... 324/252
6,282,038 B1 * 8/2001 Bonaccio et al. ............ 360/46

* cited by examiner

*Primary Examiner*—David Hudspeth
*Assistant Examiner*—Varsha A. Kapadia
(74) *Attorney, Agent, or Firm*—W. Daniel Swayze, Jr.; W. James Brady; Frederick J. Telecky, Jr.

(57) ABSTRACT

A digital temperature monitor (DTM (24)) includes a proportional-to-absolute temperature (PTAT) sensor (44) and reference circuit (48) coupled to the inputs of a comparator (42). The DTM (24) monitors the temperature of adjacent and/or proximate integrated circuitry. The method includes the steps of providing a reference signal to the comparator (42), increasing the reference signal voltage, and determining the temperature of an integrated circuit by determining when the reference signal is greater than the PTAT sensor (44) output voltage. The DTM (24) may be implemented as part of a hard-disk drive preamplifier circuit (22).

10 Claims, 4 Drawing Sheets

DIGITAL TEMPERATURE MONITOR

TECHNICAL FIELD

This invention relates generally to electronic circuits, and more particularly to a temperature monitoring circuit.

BACKGROUND OF THE INVENTION

Often in circuit designs and applications, it is useful or even critical to be able to monitor the temperature of a circuit in operation under various operational modes or environments. If electronic components become too hot, their performance may deteriorate, or the components may even be destroyed. Furthermore, the overall system in which a circuit is used can be optimized by monitoring the temperature, increasing system performance. Prior art methods of sensing or monitoring temperature are large and expensive, prohibiting use in many applications. For example, temperature monitor circuits designed for printed circuit motherboards consume a great deal of surface area and are quite costly.

FIG. 1 illustrates an example of a temperature-sensitive electronics application, a case or tower 10 for a personal computer comprising a central processing unit (CPU) (not shown). The tower 10 comprises a plurality of modules 12, 14, 16 for electronic storage of data for a personal computer. The modules may comprise, for example, a compact disk drive module 12, removable 3.5" disk drive module 14, and a hard-disk drive module 16. The tower 10 also comprises other circuit boards and connectors for communicatively coupling to a monitor, keyboard, printer, Internet and/or LAN, and other devices and equipment, not shown.

The hard-disk drive module 16 is particularly sensitive to high temperatures. The hard-disk drive module 16 typically comprises a sealed metal box having no air flow from the outside to the inside or vice versa, making it difficult to dissipate thermal energy. The electronic components of the hard-disk drive module 16 may reach high temperatures when the disk drive 16 is in operation. More recent hard-disk drive designs are faster and more powerful, thus reaching higher temperatures than before.

What is needed in the art is an integrated circuit or chip-level circuit and method of monitoring temperature.

SUMMARY OF THE INVENTION

The present invention achieves technical advantages as a digital temperature monitor circuit and method particularly beneficial for on-chip temperature monitoring in a hard-disk drive preamplifier system. A proportional-to-absolute temperature (PTAT) sensor and a reference circuit are coupled to a comparator. The PTAT sensor provides an output voltage that is a function of and proportional to the absolute temperature. The comparator is adapted to compare the voltage of the reference circuit to the PTAT sensor voltage and determine the temperature of the PTAT sensor, adjacent or proximate integrated circuit devices, or the ambient temperature.

Disclosed is a digital temperature monitor (DTM) comprising a comparator having a first and second input terminal. A PTAT sensor is coupled to the comparator first input terminal and a reference circuit is coupled to the comparator second input terminal. The comparator is adapted to compare the voltage of the reference circuit to the voltage of the PTAT sensor to determine the integrated circuit temperature.

Also disclosed is a preamplifier circuit for a hard-disk drive storage device, the preamplifier circuit comprising a DTM. The DTM includes a comparator having a first and second input terminal and a PTAT sensor coupled to the comparator first input terminal. A reference circuit is coupled to the comparator second input terminal. The comparator is adapted to compare the voltage of reference circuit to the voltage of PTAT sensor to determine the temperature of the preamplifier circuit.

Further disclosed is a method of detecting the temperature of an integrated circuit. The integrated circuit includes a comparator having a first and second input terminal. A PTAT sensor having an output voltage is coupled to comparator first input terminal, and a reference circuit is coupled to the comparator second input terminal. The method includes the steps of providing a reference signal, increasing the reference signal, and determining the temperature of integrated circuit when reference signal is greater than the PTAT sensor output voltage.

Advantages of the invention include a real estate savings for electronic circuitry, and a cost-effective circuit and method for detecting or monitoring the temperature of an electronic circuit. The digital temperature monitor of the present invention is preferably implemented integral to or as part of an integrated circuit, requiring few additional components in the application. The number of circuit elements required in the integrated circuit is minimal, including the PTAT sensor and a few logic gates along with a comparator. The transistors, gates, and other elements of the reference circuit may be "borrowed" or multiplexed by switching from other circuit components of the integrated circuit using the invention. An electronic application such as a hard-disk drive may be monitored for excessive temperatures and shut down when a predetermined temperature threshold is reached to avoid damage to electronic components and prevent erroneous results. The read and write performance of a hard-disk drive preamplifier may be optimized with the use of the present digital temperature monitor.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

PTAT sensors or Kelvin temperature sensors are precision Kelvin smart temperature sensors producing an output voltage as a function of and proportional to the absolute temperature of the PTAT sensor. The temperature of the PTAT sensor is indicative of the temperature of proximate or adjacent components or circuitry, and also indicative of the ambient temperature, for example. PTAT sensors have been developed to improved degrees of accuracy over the last few years. PTAT sensors are useful in outputting a predictable voltage at a given temperature. The relationship between the PTAT output voltage and the temperature sensed by the PTAT is linear. Because the PTAT sensor characteristics are known, when a PTAT sensor outputs a particular voltage, the temperature can be determined based on the PTAT sensor transfer characteristics.

Figure 1:
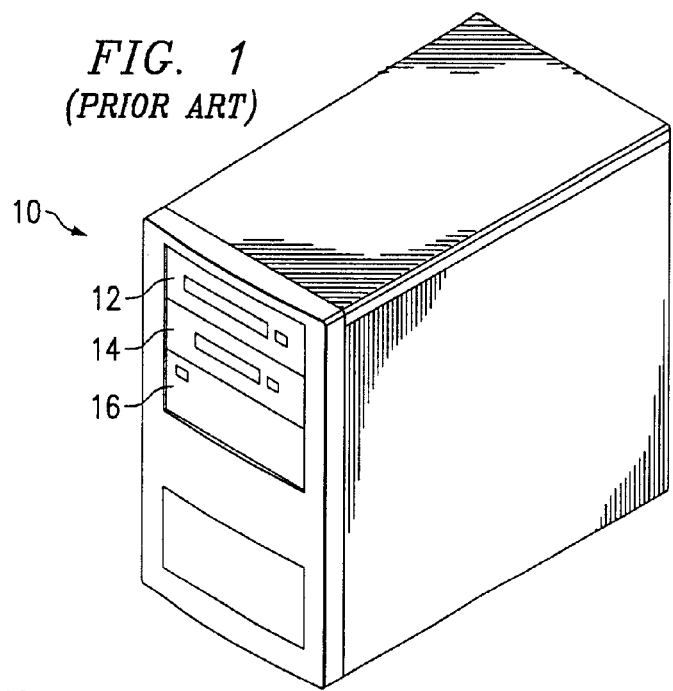
FIG. 1 illustrates a temperature sensitive electronics application of the prior art, a tower for a personal computer comprising a hard-disk drive.
Figure 2:
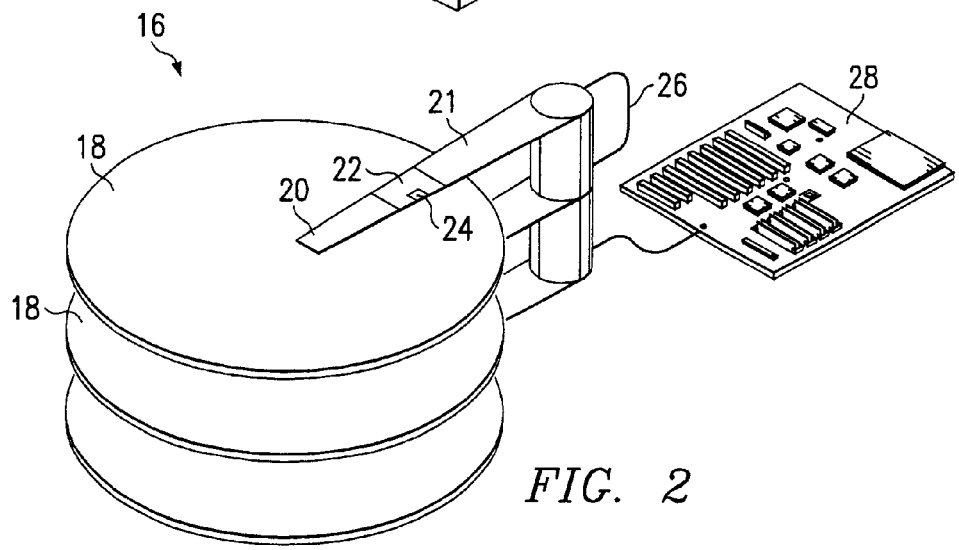
FIG. 2 illustrates an embodiment of the present invention having a digital temperature monitor integral to the preamplifier of the hard-disk drive.

The present invention utilizes a PTAT sensor and a reference circuit coupled to the inputs of a comparator in order to monitor the temperature of the PTAT sensor, an adjacent, proximate or integral integrated circuit, or a device or object coupled to the PTAT sensor, or to sense the ambient temperature, for example. FIG. 2 illustrates an exemplary embodiment of the best mode of the present invention. Shown is a hard-disk drive system 16 comprising a plurality of platters 18 adapted to store digital data and accessible by heads 20. Preamplifier 22 is preferably mounted as close as mechanically possible to the read/write head on arm 21, for example, and is coupled to the heads 20 for processing and controlling read/write analog signals. A motor 26 is coupled to heads 20 for powering the movement of the heads 20 during the read/write activities of the head 20 to/from platters 18. A printed circuit board (PCB) 28 comprises control circuitry and is coupled to heads 20 as shown, the PCB 28 being mounted to the interior wall of the hard-disk drive module, for example.

In accordance with the present invention preamplifier 22 comprises a digital temperature monitor 24 (of FIG. 5) monitoring and determining the temperature of the preamplifier 22, to be described further herein. Signals to and from the preamplifier 22 are typically the most sensitive signals to temperature in the disk drive system 16 because this is the stage where the signals are still in the analog state prior to being converted into digital signals elsewhere in the hard-disk drive system 16. Temperature variations of the preamplifier 22 will tend to vary these analog signals, causing unpredictable inaccuracies. Therefore, the digital temperature monitor 24 is preferably integral or part of a single integrated circuit comprising the preamplifier 22. However, alternatively, the digital temperature monitor 24 may be remotely located on the PCB 28, for example, or elsewhere in the hard-disk drive 16 system, not shown.

Figure 3:
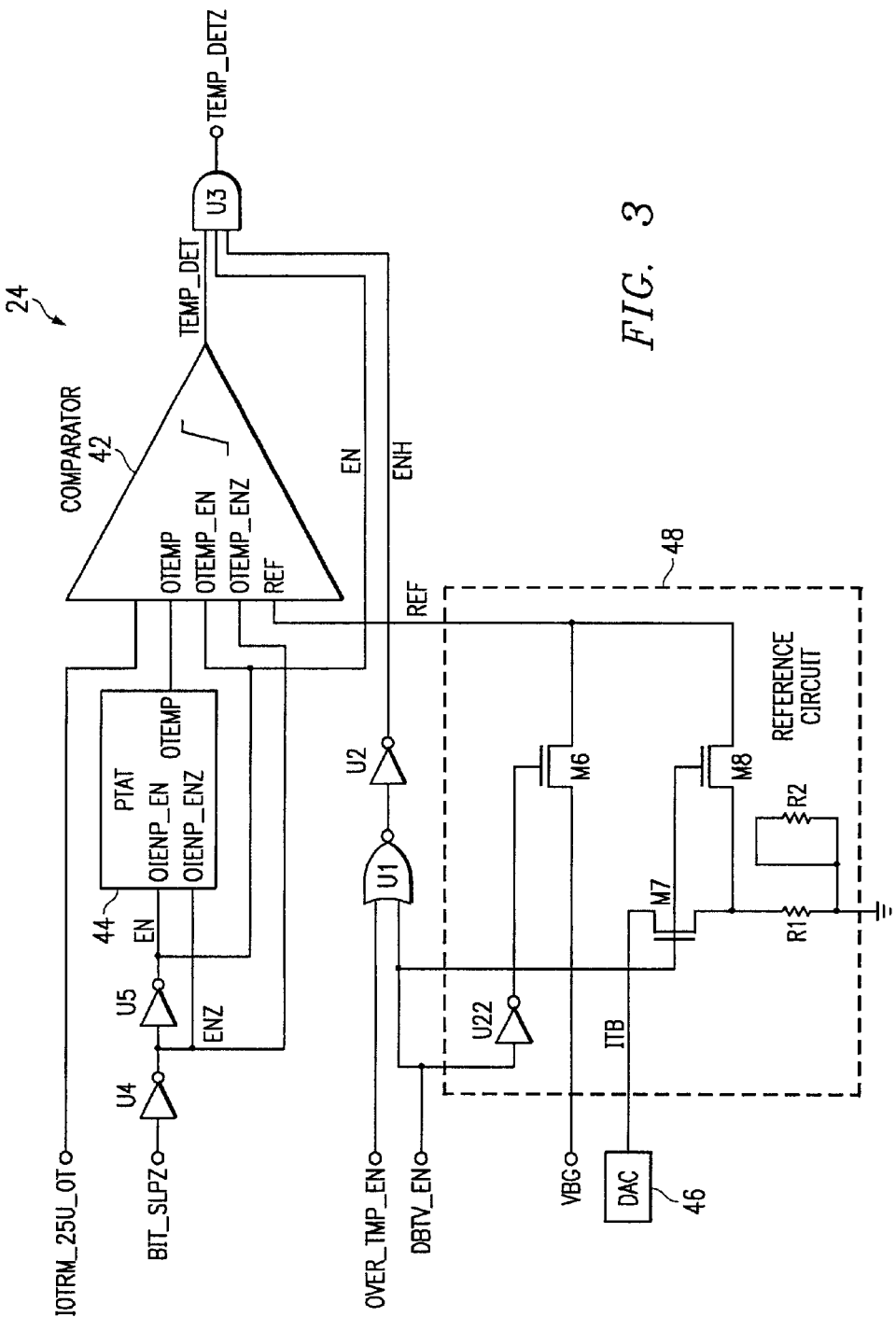
FIG. 3 is a schematic diagram showing the digital temperature monitor of the present invention having a reference circuit and PTAT sensor coupled to a comparator.

FIG. 3 illustrates a schematic diagram of the digital temperature monitor (DTM) circuit 24 of the present invention. A PTAT sensor 44 has an output coupled to a first input of a comparator 42. Reference circuit 48 has an output coupled to the second input of comparator 42, the reference circuit 48 comprising logic circuit components and other circuit elements as shown. The output of comparator 42 is coupled to one input of NAND gate U3, with other enable signals coupled to the NAND gate U3 inputs, as shown. The output of NAND gate U3 provides a temperature determination signal TEMP_DETZ as a function of these input signals.

Reference circuit 48 preferably comprises MOS transistor M6 controllably enabled via inverter U22 by a digital buffered temperature voltage enable signal or DTM enable signal DBTV_EN. Transistor M6 connects a known calibration voltage VBG to the reference input REF of comparator 42. The gates of MOS transistor M7 and M8 are enabled by a digital buffered temperature voltage (DTM enable) DBTV_EN. An analog output of digital-to-analog converter (DAC) 46 is coupled to one terminal of transistor M7 of reference circuit 48 and via transistor M8 as shown and provides the current or voltage of the reference circuit 48 output as reference signal REF to an REF input of comparator 42 as shown.

Preferably, signals OVER_TEMP_EN and DBTV_EN are not logic high at the same time. The reference circuit 48 establishes a reference signal via transistors M6 and M8 for the comparator 42 so the DTM 24 has the ability to detect the temperature of the PTAT sensor 44 and any adjacent and/or proximate electronic circuits or ambient temperature. Voltage signal VBG may be designed, for example, for a value of 1.275 volts at 130 C. Current ITB from digital to analog converter (DAC) 46 may comprise, for example, 192 microamperes plus N*6 microamperes, wherein N comprises an integer from 0 to 63.

Figure 4:
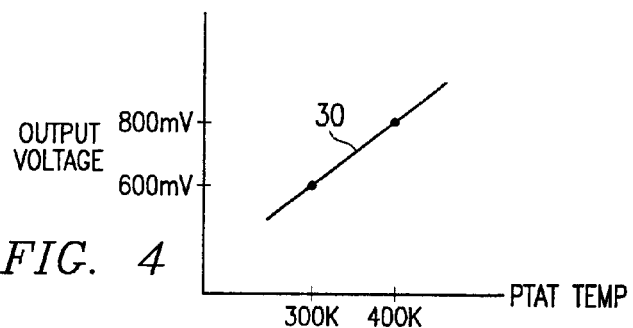
FIG. 4 shows a linear voltage-to-temperature graph of the output voltage of the PTAT sensor of the present invention.

In operation, the digital input of DAC 46 is incremented by control circuitry on PCB 28 such that the corresponding analog voltage of reference signal REF is stepped up incrementally until the reference voltage REF is determined by comparator 42 to be higher than the analog voltage of the signal OTEMP provided by the PTAT sensor 44 output. At that time, the comparator 42 provides a logic "1" output signal at its output (TEMP_DET) allowing the control circuitry on PCB 28 to determine the temperature of the PTAT sensor 44, knowing the digital signals provided to DAC 46 and thus the corresponding output analog voltage, because PTAT sensor 44 has a known output voltage to temperature linear relationship 30, shown in the graph of FIG. 4. The information regarding the analog voltage-to-temperature relationship 30 of the PTAT sensor 44 may be stored in a storage means, not shown, and referenced later by the DTM circuit 24. Other logic gates U1, U2, U4 and U5 may be utilized elsewhere in the circuit 24, as shown, to couple and control signals BIT_SLPZ, IBTRM_25U_OT, OVER_TMP_EN, DBTV_EN, and VBG.

Figure 5:
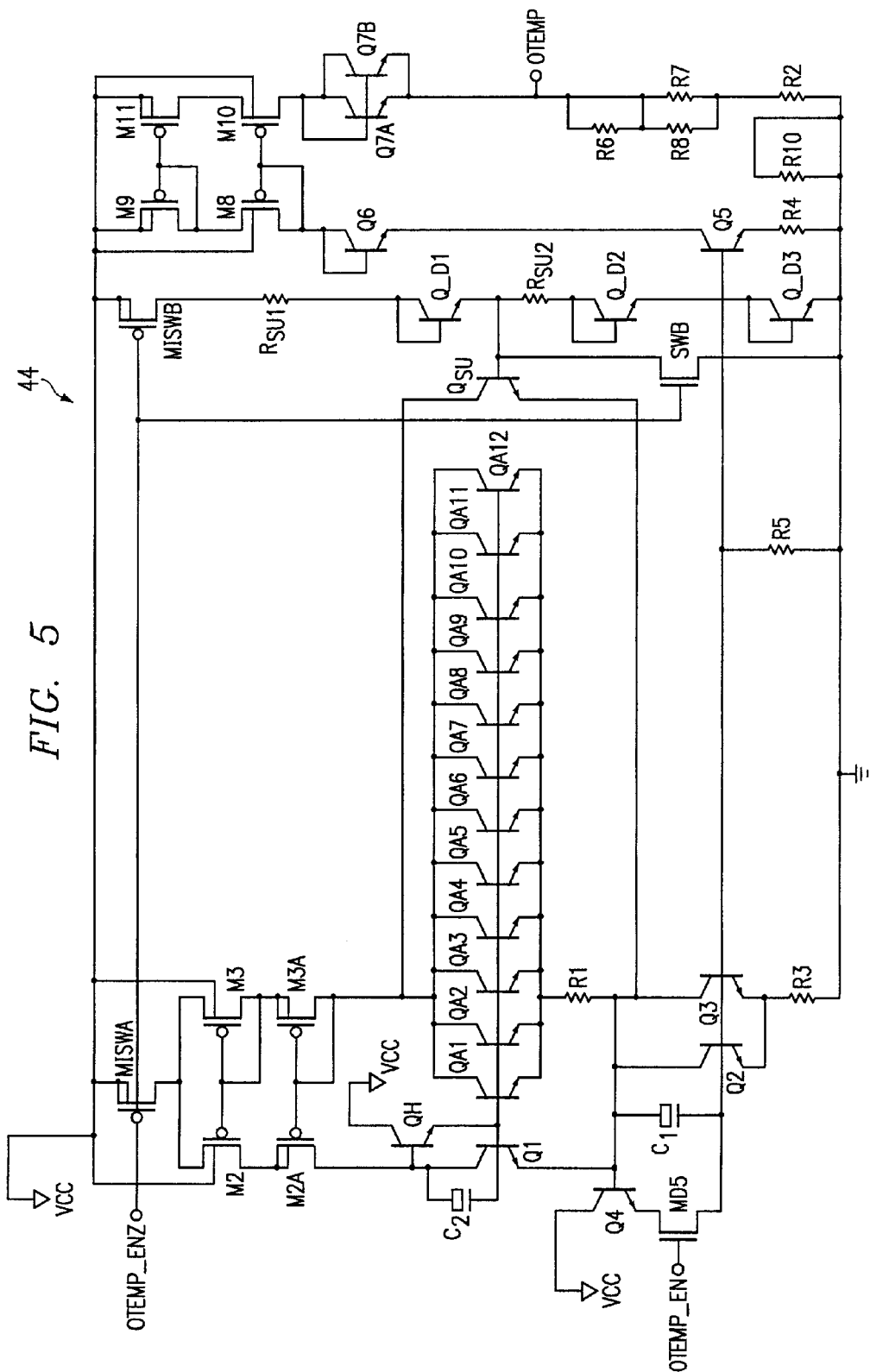
FIG. 5 is a schematic of the PTAT sensor of the digital temperature monitor.

FIG. 5 illustrates an exemplary schematic for PTAT sensor 44 of the present DTM 24. Transistors QA1 through QA12 are interleaved as shown so the current through these transistors in aggregate is approximately equal to the current through transistor Q1. Resistors R1, R6, R7 and R8 are preferably the same size, for example, 1.547 K. Preferably resistors R6, R7 and R8 are designed such that approximately 0.25% delta resistance provides a 1 shift in temperature. Preferably, resistors R1, R2, R6, R7, R8, and R10 are located proximate one another in the integrated circuit design layout and have the same orientation.

Figure 6:
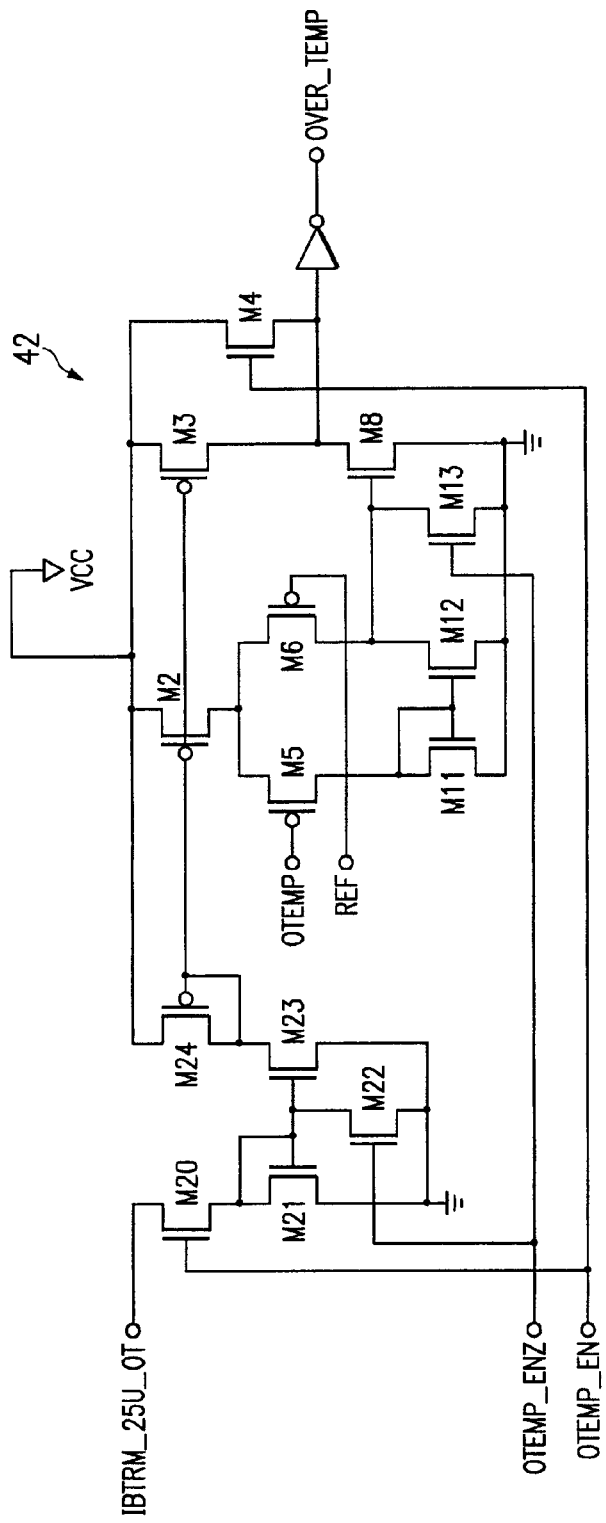
FIG. 6 is a schematic of the comparator of the digital temperature monitor of the present invention.

FIG. 6 illustrates an exemplary schematic diagram of comparator 42 of the DTM 24 of the present invention. Reference signal REF preferably has a band gap of 1.275 volts. Output signal OVER_TEMP is logic low when signal OTEMP_EN is logic low or when the voltage of signal OTEMP is less than the voltage of signal REF. Signal OVER_TEMP is logic high when signal OTEMP_EN is logic high and the voltage of signal OTEMP is greater than the voltage of signal REF.

Simulation results indicate that the DTM 24 of the present invention results in accurate temperature determination in a detection time with signal OTEMP from logic low to high of 9+/−2 nanoseconds, for a DAC current of 192 microamperes+N*6 microamp incremental steps, where N is equal 0, 1, 2, 3, . . . , 127 (7 bits) with a step size of 2.76 C per step.

The novel circuit and method of the present invention achieve technical advantages as cost-effective, real estate saving means for monitoring the temperature of electronic circuitry and/or ambient temperature proximate the PTAT 44. The digital temperature monitor of the present invention is preferably implemented integral to an integrated circuit, requiring few additional components in the application, particularly when the DTM 24 is implemented within a hard-disk drive preamplifier 22. The number of circuit elements required in the integrated circuit is minimal, including the PTAT sensor 44 and a few logic gates along with a comparator. The transistors M6, M7, M8, gate U22, and other elements R1 and R2 of the reference circuit 48 may be "borrowed" or multiplexed by switching from other circuit components of the preamplifier 22 or integrated circuit. An electronic application such as a preamplifier 22 of a hard-disk drive may be monitored for excessive temperatures and shut down when a predetermined temperature threshold, such as 140 degrees C., for example, is reached, in accordance with the present invention, to prevent damage to temperature-sensitive components and avoid erroneous output.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the DTM 24 described herein is preferably integral to a preamplifier 22 or other temperature-sensitive integrated circuits. Alternatively, DTM 24 may be comprise a stand-alone separate device or circuit. The schematics shown for PTAT sensor 44 and comparator 42 in FIGS. 5 and 6 are exemplary: other PTAT sensor and comparator designs are anticipated. It is therefore intended that the appended claims encompass any such modifications or embodiments.

What is claimed is:

1. A digital temperature monitor (DTM), comprising:
   a comparator having a first and second input terminal;
   a proportional-to-absolute temperature (PTAT) sensor providing a first voltage to said comparator first input terminal; and
   a reference circuit providing a second voltage to said comparator second input terminal, wherein said comparator is adapted to compare the second voltage to the first voltage of said PTAT sensor to determine the temperature of the PTAT sensor,
   wherein said second voltage is programmable,
   wherein said programmable second voltage is a function of a programmable current conducting through said reference circuit, and
   wherein said programmable current ranges from 192 microamperes to 192 microamperes plus N*6 microamperes, where N comprise an integer from 1 to 63.

2. A digital temperature monitor (DTM), comprising:
   a comparator having a first and second input terminal;
   a proportional-to-absolute temperature (PTAT) sensor providing a first voltage to said comparator first input terminal; and
   a reference circuit providing a second voltage to said comparator second input terminal, wherein said comparator is adapted to compare the second voltage to the first voltage of said PTAT sensor to determine the temperature of the PTAT sensor,
   wherein said reference circuit comprises:
      a resistor having a first end coupled to ground and a second end;
      a first transistor coupled to said resistor second end;
      a second transistor coupled to said resistor second end and said comparator second input terminal; and
      a third transistor coupled to said comparator second input terminal,
   wherein said first transistor receives an analog signal; and
   said first and second transistor gates are driven by an enable signal, to a first inverter receives said enable signal, the output of said first inverter driving said third transistor gate.

3. A preamplifier circuit for a hard-disk drive storage device, said preamplifier circuit comprising amplification circuitry and a digital temperature monitor (DTM) providing an output signal, said DTM comprising:
   a comparator having a first and second input terminal;
   a proportional-to-absolute temperature (PTAT) sensor providing a first voltage to said comparator first input terminal; and
   a reference circuit providing a second voltage to said comparator second input terminal, wherein said comparator is adapted to compare the second voltage to the first voltage to determine the temperature of the preamplifier circuit, said comparator providing said output signal as a function of said compared first and second voltages.

4. The preamplifier circuit according to claim 3 wherein said second voltage is programmable.

5. The preamplifier circuit according to claim 4 wherein said second voltage is a function of a programmable current conducting through said reference circuit.

6. The preamplifier circuit according to claim 5 wherein said reference circuit comprises:
   a resistor having a first end coupled to ground and a second end;
   a first transistor coupled to said resistor second end;
   a second transistor coupled to said resistor second end and said comparator second input terminal; and
   a third transistor coupled to said comparator second input terminal.

7. A preamplifier circuit for a hard-disk drive storage device, said preamplifier circuit comprising amplification circuitry and a digital temperature monitor (DTM) providing an output signal, said DTM comprising:
   a comparator having a first and second input terminal;
   a proportional-to-absolute temperature (PTAT) sensor providing a first voltage to said comparator first input terminal; and
   a reference circuit providing a second voltage to said comparator second input terminal, wherein said comparator is adapted to compare the second voltage to the first voltage to determine the temperature of the preamplifier circuit, said comparator providing said output signal as a function of said compared first and second voltages,
   wherein said second voltage is programmable;
   wherein said second voltage is a function of a programmable current conducting through said reference circuit; and
   wherein said programmable current ranges from 192 microamperes to 192 plus N*6 microamperes, where N comprise an integer from 1 to 63.

8. A preamplifier circuit for a hard-disk drive storage device, said preamplifier circuit comprising amplification circuitry and a digital temperature monitor (DTM) providing an output signal, said DTM comprising:

a comparator having a first and second input terminal;

a proportional-to-absolute temperature (PTAT) sensor providing a first voltage to said comparator first input terminal; and a reference circuit providing a second voltage to said comparator second input terminal, wherein said comparator is adapted to compare the second voltage to the first voltage to determine the temperature of the preamplifier circuit, said comparator providing said output signal as a function of said compared first and second voltages, wherein said second voltage is programmable;

wherein said second voltage is a function of a programmable current conducting through said reference circuit; and wherein said reference circuit comprises:
  a resistor having a first end coupled to ground and a second end;
  a first transistor coupled to said resistor second end;
  a second transistor coupled to said resistor second end and said comparator second input terminal; and
  a third transistor coupled to said comparator second input terminal, wherein:
    said first transistor is received by an analog signal; and
    said first and second transistor gates being driven by an enable signal, to a first inverter to receive said enable signal, the output of said first inverter driving said third transistor gate.

9. The preamplifier according to claim 8 further comprising a shut-down circuit adapted to shut down said preamplifier circuit after a predetermined temperature threshold has been reached as a function of the comparator output signals.

10. The preamplifier circuit according to claim 9 wherein said predetermined threshold temperature is about 140 degrees C.

* * * * *